US006565973B2

(12) United States Patent
Duff et al.

(10) Patent No.: US 6,565,973 B2
(45) Date of Patent: May 20, 2003

(54) COMPOSITE PARTICLES

(75) Inventors: Daniel-Gordon Duff, Leverkusen (DE); Werner Hoheisel, Köln (DE); Kai Bütje, Duisburg (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/972,547

(22) Filed: Oct. 5, 2001

(65) Prior Publication Data

US 2002/0071948 A1 Jun. 13, 2002

(30) Foreign Application Priority Data

Oct. 9, 2000 (DE) .......................... 100 49 803

(51) Int. Cl.[7] ............................... B32B 5/16
(52) U.S. Cl. .................. 428/402; 428/403; 428/404; 428/406; 428/407
(58) Field of Search ................ 428/402, 403, 428/404, 406, 407

(56) References Cited

U.S. PATENT DOCUMENTS

| 2,913,419 A | 11/1959 | Alexander ............... 516/80 |
| 5,354,374 A | 10/1994 | Prengel .................. 106/459 |
| 5,827,507 A * | 10/1998 | Oshima ................... 424/59 |
| 6,024,789 A | 2/2000 | Kwan et al. ............. 106/460 |
| 6,136,083 A | 10/2000 | Schmidt et al. .......... 106/403 |
| 6,183,658 B1 | 2/2001 | Lesniak et al. ......... 252/62.56 |
| 6,231,661 B1 | 5/2001 | Hayashi et al. .......... 106/456 |

FOREIGN PATENT DOCUMENTS

| EP | 0 609 533 A1 | 8/1994 |
| EP | 0 704 500 A1 | 4/1996 |
| EP | 0 947 564 A1 | 10/1999 |
| JP | 5-208829 | 8/1993 |
| JP | 7-126018 | 5/1995 |

OTHER PUBLICATIONS

Catalysis Today 34 (month unavailable) 1997, pp. 281–305, Chapter 3, Catalyst preparation methods, Carlo Perego, Pierluigi Villa.
React. Kinet. Catal. Lett. vol. 66m No. 1, pp. 183–188, (month unavailable) 1999, Synthesis and Catalytic Properties of Porous α–$fe_2O_3$/$SiO_2$ Catalyst, Liwei Wang, Zichen Wang, Jingzhe Zhao, Hua Yang and Muyu Zhao.
Patent Abstracts of Japan vol. 006, No. 128, Jul. 14, 1985 & JP 57 056904 A (Toshiba), Apr. 5, 1982 Zusammenfassung.
Patent Abstracts of Japan, vol. 014, No. 134, Mar. 14, 1990 & JP 02 008260 A (Nippon Sheet) Jan. 11, 1990 Zusammenfassung.
Database WPI Section Ch, Week 198810 Derwent Publications Ltd., Londo, GB; AN 1988–067083 XP002187612 & JP 63 020 367 A (UBE IND), Jan. 28, 1988 Zusammenfassung.

* cited by examiner

*Primary Examiner*—Leszek Kiliman
(74) *Attorney, Agent, or Firm*—Joseph C. Gil; Thomas W. Roy

(57) ABSTRACT

The present invention relates to a composite particle containing a solid inorganic or organic colorless support material and adherent to it an inorganic and/or organic pigment particle, wherein the pigment particle has an average particle size of 1 nm to 100 nm, comprises at least one primary pigment particle and the minimum average distance between two pigment particles is at least one quarter of the diameter of the primary pigment particle, whereby the modified inorganic and organic pigments, depending on the pigment material, can be used as IR light absorbers or as color-imparting agents and give rise to a negligible haze in the matrix.

20 Claims, 10 Drawing Sheets

COMPOSITE PARTICLES

BACKGROUND OF THE INVENTION

The present invention relates to composite particles which represent substantially improved modifications of inorganic and organic pigments and which, depending on the pigment material, act as absorbers for visible and/or infrared light and can therefore be used as color-imparting agents and/or as infrared (IR) light absorbers and give rise to a negligible haze in the matrix.

The composite particles according to the invention can be used in media in which a high transparency, in other words low haze, is important, such as e.g. in clear varnishes, paints, plastics, glass or coatings made from these materials. They can also be used to adjust color tones in non-transparent media.

It is known that the size of inorganic pigments that are used in transparent systems should be below 10 nm or only a few tenth of nm in order not to give rise to additional haze. Given their generally lower refractive index, this limit is set at somewhat larger particle sizes in the case of organic pigments, but here too excessively large pigments lead to haze. In addition, these small particles—also known as "nanoparticles"—must be very well dispersed in the matrix and stabilized, since an agglomeration of these particles, in other words the formation of large secondary particles, again leads to haze and often also to a change in color.

The disadvantage of the known technical solutions to this problem is the time and cost involved in incorporating the nanoparticles into the matrix in the necessary degree of dispersion. The particles, which are generally present in the form of powders or pastes, are subjected to intensive shear forces (e.g. by grinding) in order to break up the large agglomerates that are present into such small units that the scattering of light by these units and hence also the haze of the matrix (e.g. surface coating binder) becomes negligible. Breaking up agglomerated nanoparticles into isolated primary particles generally requires a substantially greater effort than is the case with agglomerates consisting of larger primary particles (>100 nm), for example. However, since the practically complete deagglomeration of the nanoparticles is absolutely essential for a transparent coloration, the poor dispersibility of conventional, transparent pigments becomes a very substantial disadvantage for their use.

The distribution of UV-absorbing inorganic particles in or on dielectric particles measuring around 300 nm in size, which in turn are incorporated into the matrix as supports, to ensure the transparency of the matrix when UV light-absorbing pigments are used in cosmetics, has been reported in WO 95/09895. The material from which the large dielectric particles are formed is chosen according to the matrix used such that the refractive index of the compound particle consisting of dielectric particle and pigment differs only marginally from the refractive index of the surrounding matrix, thereby maximising transmission in the entire visible part of the light spectrum. This publication discloses only UV-absorbing particles such as e.g. $TiO_2$ or ZnO, however. The objective here was to obtain as high an optical transmission as possible in the wavelength range above 400 nm, which inevitably excludes colored pigments and solar IR absorbers.

Most attempts to improve the transparency and incorporability of transparent pigments target the dispersibility of the pigments. For instance, it was reported that an improved dispersibility of fine haematite particles could be achieved by means of an organic (JP-A 07 126 018) or inorganic (JP-A 05 208 829) treatment of the pigments or coating of the pigment particle surface. By improving the compatibility between the particle surfaces and the matrix or by shielding the adhesive forces between the pigment particles, the effort required for dispersion can be somewhat reduced. Nevertheless, all of these proposed approaches still require a very laborious dispersion down to almost primary particle size in order to achieve a transparent, intensive coloration. In fact, in the secondary treatment of iron oxide haematite particles with, amongst other things, silicon dioxide (EP-A 0 997 500), a $SiO_2$ proportion of greater than 20% is expressly deemed to be unreasonable because the two desired effects of ageing resistance and improved dispersibility are already achieved with significantly less secondary treatment material.

The production of supported particles, which can also be colored, is reported in connection with their use as heterogeneous catalysts (Catal. Today (1997), 34, 281–305). Iron oxide haematite applied to silicon dioxide for use as a heterogeneous catalyst is also described (React. Kinet. Catal. Lett. (1999), 66,183–188). There is no mention of a possible use as a transparent pigment, however, and the transfer of catalyst properties to optical pigment properties in a polymer or paint matrix is in no way obvious.

In order to synthetically adjust a mineral, thivier's earth, a pressed cake of iron oxide particles in the goethite crystal modification was incorporated into a silicon dioxide dispersion (EP-A 0 947 564). However, the objective of this work was a composite in which the particle size of the iron oxide preferably has a value of between 0.1 and 1 $\mu$m. This resulted not in a transparent color but rather—as is immediately apparent to the person skilled in the art—a scattered color. These pigments would therefore be unsuitable for the transparent coloration of organic matrices.

An object underlying the present invention was therefore to provide specially modified highly transparent composite particles which absorb visible and/or infrared light and do not exhibit the disadvantages known in the prior art. Infrared (IR) light refers here to light that in solar radiation lies on either side of the visibility limit, i.e. in the wavelength range between approx. 700 nm and approx. 2500 nm.

SUMMARY OF THE INVENTION

The invention relates to a composite particle comprising a solid inorganic or organic colorless support material and adherent to it an inorganic and/or organic pigment particle, wherein the pigment particle has an average particle size of 1 nm to 100 nm, comprises at least one primary pigment particle and the minimum average distance between two pigment particles is at least one quarter of the diameter of the primary pigment particle.

DETAILED DESCRIPTION OF THE INVENTION

Figure 1:
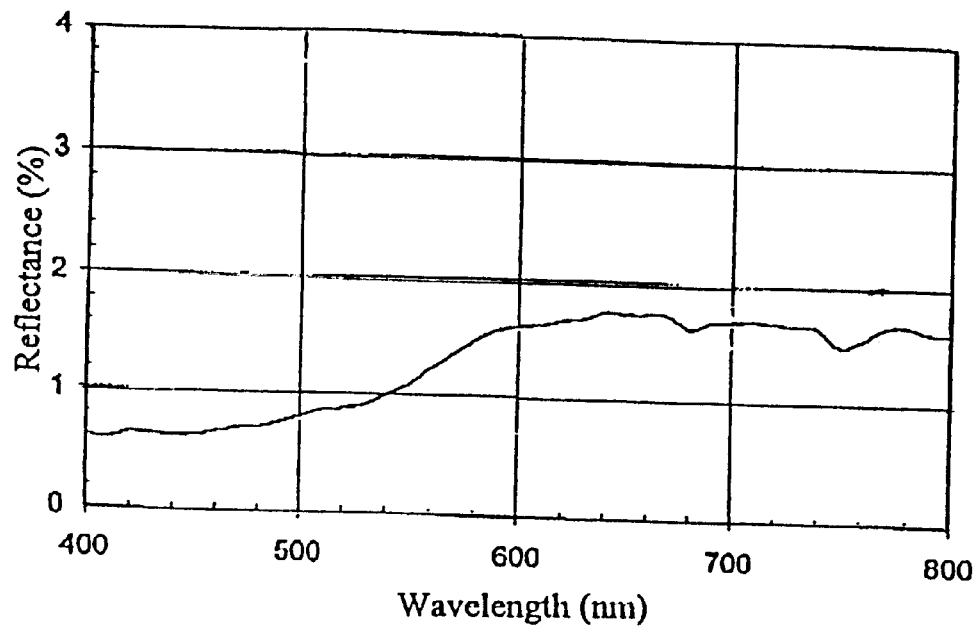
FIGS. 1 and 2 demonstrate the advantageous properties of the paint of example 1. The diffuse reflectance by the coats of paint on the black and white substrate is shown as a function of the wavelength.

The invention specifically relates to such composite particles which contain inorganic and/or organic pigment particles having a primary particle size of 1 nm to 100 nm, preferably between 1 nm and 50 nm, which adhere to solid inorganic or organic colorless support material, preferably particles having a primary particle size of 1 nm to 200 nm, whereby either the pigment primary particles are substantially not agglomerated with other pigment primary particles and moreover are generally positioned at a certain minimum distance from one another, or any agglomerates that may be formed among these pigment primary particles are smaller than 100 nm, preferably smaller than 50 nm, and these are then positioned at a certain minimum distance from one another. Said minimum distance should generally be at least one quarter of the diameter of the particles or agglomerates. The term pigment refers here and below to such particles that absorb visible and/or infrared light.

It was found that combining individual pigment particles having a primary particle size of 1 nm to 100 nm with a support consisting of agglomerates of semiconducting oxide, metal oxide or polymer particles having a primary particle size of 1 nm to 10 $\mu$m, preferably 2 nm to 500 nm, is advantageous. To avoid haze, these composite particles consisting of supported pigments require only very coarse and hence simple dispersion in a matrix, since a moderate agglomeration of these support pigments of up to a few $\mu$m in size does not lead to haze in the matrix and hence can be tolerated. The term matrix refers here to a dielectric material such as e.g. a clear varnish, paint, plastic, glass or a coating material. Here and below, primary particle size is defined as corresponding to the diameter of a sphere of the same volume.

It was also found that encapsulating individual pigment particles having a primary particle size of 1 nm to 100 nm with other primary particles or encapsulating particles consisting of semiconducting oxides, metal oxides or polymers having a total coating thickness of 1 nm to 10 $\mu$m is advantageous. To avoid haze, these pigments encapsulated with other particles require only very coarse and hence simple dispersion in a matrix, since a moderate agglomeration of these encapsulated pigments of up to a few $\mu$m in size does not lead to haze in the matrix and hence can be tolerated. The term matrix refers here to a dielectric material such as e.g. a clear varnish, paint, plastic, glass or a coating material.

The support particle or the encapsulation, coating or shell around the pigment particles thus act as spacers for the optically active pigment cores, which measure up to a few tens of nanometers in size, in order to decouple them electromagnetically. When decoupled in this way, even an agglomeration of the support particles or encapsulated particles gives rise to no substantial light scattering. A further condition for the reduction of light scattering by the supported or encapsulated pigments is that the material from which the support or shell is made displays a similar refractive index to the surrounding matrix. In most material combinations between support or shell and pigment the support material should in fact display an even lower and in a few cases a somewhat higher refractive index than the surrounding matrix. In all cases the average refractive index for the supported or encapsulated pigment is only slightly different from the refractive index of the surrounding matrix, thereby further minimising light scattering.

The invention therefore also relates to composite particles containing inorganic and/or organic pigment particles having an average primary particle size of 1 nm to 100 nm, preferably between 1 nm and 50 nm, which adhere to solid inorganic or organic colorless support particles having a primary particle size of on average 1 nm to 200 nm, characterised in that the pigment primary particles are not substantially agglomerated with other pigment primary particles and are generally positioned at a certain minimum distance from one another, whereby this distance should generally be one quarter of the diameter of the pigment primary particles.

The invention further relates to composite particles containing pigment particles having an average primary particle size of 1 nm to 100 nm, preferably 1 nm to 50 nm, which are encapsulated with other primary particles, also known as encapsulating particles, or with a solid inorganic or organic coating, whereby the coating thickness of the shell should generally be at least one eighth of the diameter of the pigment primary particles.

The invention also relates to composite particles containing agglomerates of inorganic and/or organic pigment particles having an average primary particle size of 1 nm to 100 nm, preferably between 1 nm and 50 nm. Said agglomerates adhere to solid inorganic or organic colorless support material, preferably particles having an average primary particle size of 1 nm to 200 nm and are characterised in that on average they are smaller than 100 nm, preferably smaller than 50 nm, and are generally positioned at a certain minimum distance from one another, whereby this distance should generally be one quarter of the diameter of the agglomerates.

The invention further relates to composite particles containing agglomerates of inorganic and/or organic pigment particles having a primary particle size of on average 1 nm to 100 nm, preferably between 1 nm and 50 nm. Said agglomerates are on average smaller than 100 nm, preferably smaller than 50 nm, and are encapsulated with a solid or particulate, inorganic or organic coating, whereby the total coating thickness of the shell is generally at least one eighth of the diameter of the agglomerates.

The invention also relates to composite particles as described above but containing combinations of various types of pigment particles, support particles and/or encapsulating particles.

The invention additionally relates to transparent color-imparting and/or transparent IR-absorbing coating materials consisting of the composite particles, which are incorporated into a clear varnish (such as polyester, acrylic, alkyd resin, chlorinated rubber, epoxy resin, acrylic resin, oil, nitrocellulose, polyester, polyurethane varnishes as well as combination varnishes based on cellulose nitrates and alkyd resins), plastic or glass.

The invention additionally relates to transparently colored and/or transparent IR-absorbing materials containing a plastic (e.g. polycarbonate, polyamide, polyethylene, polypropylene, polymethacrylate, polymethyl methacrylate, polyurethane, polyethylene terephthalate, polystyrene, styrene acrylonitrile) or glass, into which the composite particles according to the invention are incorporated.

The term inorganic pigments covers metals such as Cu, Ag, Au, Pt, Pd, Co or alloys of these elements, semiconductors such as Si and all oxides, nitrides, phosphides and sulfides of metals and semiconductors, together with other materials such as aluminates, particularly iron oxides and iron oxide hydroxides, chromium oxides, cadmium sulfide, cadmium selenide, cadmium sulfoselenide, bismuth vanadate, chromate pigments, ultramarine pigments, iron-blue pigments and mixed phase pigments, like doped rutile pigments. The term inorganic pigments also covers doped materials including tin-doped indium oxide, aluminium-doped zinc oxide, antimony-doped tin oxide, fluorine-doped tin oxide or metal-doped silicon oxide.

Suitable inorganic pigments also include inorganic materials whose crystal lattice (host material) is doped with foreign ions such that the material fluoresces. These include in particular all materials and material classes that are used as so-called phosphors in fluorescent screens or lamps and such as are cited in Ullmann's Encyclopedia of Industrial Chemistry, WILEY-VCH, $6^{th}$ edition, 1999 Electronic Release, chapter entitled "Luminescent Materials: 1. Inorganic Phosphors". Materials that are suitable as inorganic pigment in accordance with the invention therefore include such materials of type XY:A, whereby X is a cation from one or more elements from main groups 1a, 2a, 3a, 4a, from subgroups 2b, 3b, 4b, 5b, 6b, 7b or from the lanthanides of the periodic system, Y is either a polyatomic anion from one or more element(s) from main groups 3a, 4a, 5a, from subgroups 3b, 4b, 5b, 6b, 7b and/or 8b and element(s) from main groups 6a and/or 7 or a monoatomic anion from main group 5a, 6a or 7a of the periodic system and A is the doping material consisting of anions from one or more elements from the lanthanides and/or elements from main groups 1a, 2a and/or Al, Cr, Tl, Mn, Ag, Cu, As, Nb, Nd, Ni, Ti, In, Sb, Ga, Si, Pb, Bi, Zn, Co. The concentration of doping material in the host lattice is between $10^{-5}$ mol % and 50 mol %, preferably between 0.01 mol % and 30 mol %, particularly preferably between 0.1 mol % and 20 mol %.

Within the material class of fluorescent pigment particles, sulfides, selenides, sulfoselenides, oxysulfides, borates, aluminates, gallates, silicates, germanates, phosphates, halophosphates, oxides, arsenates, vanadates, niobates, tantalates, sulfates, wolframates, molybdates, alkali halides and other halides or nitrides are preferably used as host materials for the fluorescent pigment particles. Examples of these material classes together with the corresponding dopings include those that are listed below (materials of type B:A where B=host material and A=doping material): LiI:Eu; NaI:Tl; CsI:Tl; CsI:Na; LiF:Mg; LiF:Mg,Ti; LiF:Mg,Na; KMgF$_3$:Mn; Al$_2$O$_3$:Eu; BaFCl:Eu; BaFCl:Sm; BaFBr:Eu; BaFCl$_{0.5}$Br$_{0.5}$:Sm; BaY$_2$F$_8$:A (A=Pr, Tm, Er, Ce); BaSi$_2$O$_5$:Pb; BaMg$_2$Al$_{16}$O$_{27}$:Eu; BaMgAl$_{14}$O$_{23}$:Eu; BaMgAl$_{10}$O$_{17}$:Eu; BaMgAl$_2$O$_3$:Eu; Ba$_2$P$_2$O$_7$:Ti; (Ba,Zn,Mg)$_3$Si$_2$O$_7$:Pb; Ce(Mg,Ba)Al$_{11}$O$_{19}$; Ce$_{0.65}$Tb$_{0.35}$MgAl$_{11}$O$_{19}$:Ce,Tb: MgAl$_{11}$O$_{19}$:Ce,Tb; MgF$_2$:Mn; MgS:Eu; MgS:Ce; MgS:Sm; MgS:(Sm,Ce); (Mg,Ca)S:Eu; MgSiO$_3$:Mn; 3.5MgO.0.5MgF$_2$.GeO$_2$:Mn; MgWO$_4$:Sm; MgWO$_4$:Pb; 6MgO.As$_2$O$_5$:Mn; (Zn,Mg)F$_2$:Mn; (Zn$_4$Be)SO$_4$:Mn; Zn$_2$SiO$_4$:Mn; Zn$_2$SiO$_4$:Mn,As; ZnO:Zn; ZnO:Zn,Si,Ga; Zn$_3$(PO$_4$)$_2$:Mn; ZnS:A (A=Ag, Al, Cu); (Zn,Cd)S:A (A=Cu, Al, Ag, Ni); CdBO$_4$:Mn; CaF$_2$:Mn; CaF$_2$:Dy; CaS:A A=lanthanides, Bi); (Ca,Sr)S:Bi; CaWO$_4$:Pb; CaWO$_4$:Sm; CaSO$_4$:A (A=Mn, lanthanides); 3Ca$_3$(PO$_4$)$_2$.Ca(F,Cl)$_2$:Sb,M$_n$; CaSiO$_3$:Mn,Pb; Ca$_2$Al$_2$Si$_2$O$_7$:Ce; (Ca,Mg)SiO$_3$:Ce; (Ca,Mg)SiO$_3$:Ti; 2SrO.6(B$_2$O$_3$).SrF$_2$:Eu; 3Sr$_3$(PO$_4$)$_2$.CaCl$_2$:Eu; A$_3$(PO$_4$)$_2$.ACl$_2$:Eu (A=Sr, Ca, Ba); (Sr,Mg)$_2$P$_2$O$_7$:Eu; (Sr,Mg)$_3$(PO$_4$)$_2$:Sn; SrS:Ce; SrS:Sm,Ce; SrS:Sm; SrS:Eu; SrS:Eu, Sm; SrS:Cu,Ag; Sr$_2$P$_2$O$_7$:Sn; Sr$_2$P$_2$O$_7$:Eu; Sr$_4$Al$_{14}$O$_{25}$:Eu; SrGa$_2$S$_4$:A (A=lanthanides, Pb); SrGa$_2$S$_4$:Pb; Sr$_3$Gd$_2$Si$_6$O$_{18}$:Pb,Mn; YF$_3$:Yb,Er; YF$_3$:Ln (Ln= lanthanides); YLiF$_4$:Ln (Ln=lanthanides); Y$_3$Al$_5$O$_{12}$:Ln (Ln=lanthanides); YAl$_3$(BO$_4$)$_3$:Nd,Yb; (Y,Ga)BO$_3$:Eu; (Y,Gd)BO$_3$:Eu; Y$_2$Al$_3$Ga$_2$O$_{12}$:Tb; Y$_2$SiO$_5$:Ln (Ln= lanthanides); Y$_2$O$_3$:Ln (Ln=lanthanides); Y$_2$O$_2$S:Ln (Ln= lanthanides); YVO$_4$:A (A=lanthanides, In); Y(P,V)O$_4$:Eu; YTaO$_4$:Nb; YAlO$_3$:A (A=Pr, Tm, Er, Ce); YOCl:Yb,Er; LnPO$_4$:Ce,Tb (Ln=lanthanides or mixtures of lanthanides); LuVO$_4$:Eu; GdVO$_4$:Eu; Gd$_2$O$_2$S:Tb; GdMgB$_5$O$_{10}$:Ce,Tb; LaOBr:Tb; La$_2$O$_2$S:Tb; LaF$_3$:Nd,Ce; BaYb$_2$F$_8$:Eu; NaYF$_4$:Yb,Er; NaGdF$_4$:Yb,Er; NaLaF$_4$:Yb,Er; LaF$_3$:Yb,Er, Tm; BaYF$_5$:Yb,Er; Ga$_2$O$_3$:Dy; GaN:A (A=Pr, Eu, Er, Tm); Bi$_4$Ge$_3$O$_{12}$; LiNbO$_3$:Nd,Yb; LiNbO$_3$:Er; LiCaAlF$_6$:Ce; LiSrAlF$_6$:Ce; LiLuF$_4$:A (A=Pr, Tm, Er, Ce); Li$_2$B$_4$O$_7$:Mn, SiO$_x$:Er,Al ($0 \leq x \leq 2$).

Suitable examples of materials for the support material, the support particles or the encapsulating material and particles include such oxides, fluorides, chlorides of metals and semiconductors as well as alumino-silicates or polymers, which are substantially transparent in the visible spectral range.

The term volume concentration relates to the proportion of pigment volume in the total volume of the solid phase of the composite particles. The total volume is the volume of the pigment plus that of the support material, excluding any voids in the composite.

In a preferred embodiment non-metallic pigments are present in a volume concentration of 1% to 60% and metallic pigments at 1% to 40% relative to the pigment/support composite. In a more preferred embodiment non-metallic pigments are present in a volume concentration of 10% to 50% and metallic pigments at 5% to 20% relative to the pigment/support composite.

In another preferred embodiment non-metallic pigments are present in a volume concentration of 1% to 60% and metallic pigments at 1% to 40% relative to the encapsulating pigment composite. In another more preferred embodiment non-metallic pigments are present in a volume concentration of 10% to 50% and metallic pigments at 5% to 20% relative to the encapsulating pigment composite.

In a further preferred embodiment the support material, preferably particles or the encapsulating material have a real refractive index of between 1.3 and 1.9 in the visible spectral range. The use of silicon dioxide as support material or encapsulating material is particularly advantageous.

In an ideal case the refractive index of the composite particle containing pigment and support material, preferably particles is the same as that of the matrix into which the composite particles are incorporated for the purposes of coloration. In this particularly preferred embodiment the volume concentration of the pigment relative to the pigment/support composite approximates to a value that can be obtained from the following mathematical relationship:

$$C_{vol} = (N_{ma} - N_{tr})/(N_{pi} - N_{tr})$$

$C_{vol}$ is the volume concentration of the pigment relative to the pigment/support composite, $N_{ma}$ is the refractive index of the matrix into which the composite is incorporated, $N_{tr}$ is the refractive index of the support material and $N_{pi}$ is the refractive index of the pigment. Refractive index refers here in each case to the real component.

However, the refractive index of the composite may differ slightly, preferably by no more than 0.3 units, from that of the surrounding matrix.

In a further preferred embodiment the permissible agglomerates of the support/pigment composite or pigment/encapsulating particle composite are smaller than 50 μm, particularly preferably smaller than 10 μm, most particularly preferably smaller than 2 μm, in order to avoid specks that are visible to the naked eye and to ensure a homogeneous perceived color or infrared absorption.

In a further possible embodiment the composite can be modified by means of inorganic or organic secondary treatment at the surface, such that the dispersibility of the composite in the matrix is improved.

The invention is further illustrated but is not intended to be limited by the following examples in which all parts and percentages are by weight unless otherwise specified.

EXAMPLES

Example 1

In order to demonstrate the advantageous effect of the composite particles according to the invention, iron oxide nanoparticles (haematite) of around 10 nm in size, which had been applied to silicon dioxide particles, were used. This particle size was determined by means of electron microscopic examinations.

Production of the Support Pigments:

To prepare an iron oxide sol, 2.7 g iron(III) chloride (FeCl$_3$.6H$_2$O) were dissolved in 50 ml distilled water. A further volume of 450 ml distilled water was heated to boiling and the fresh iron(III) chloride solution was added dropwise (less than 2 ml/min) at boiling point with very intensive stirring. The solution was then boiled for a further 10 minutes and then cooled. Nanoparticles of iron(III) oxide in the haematite crystal form are formed in the water. To apply these iron oxide particles to silicon dioxide supports, 200 ml distilled water were measured out and 3.2 g silicon dioxide particles (Aerosil 200, Degussa, Del.) dispersed therein. In order to improve the dispersion state, the predispersion was treated with an ultrasonic wand (200 W, 5 min). The iron oxide sol was then added to the silicon dioxide dispersion with stirring, sodium hydroxide solution added until a pH value of 3.5 was obtained and the mixture stirred for a further 5 minutes. The solid was separated off by centrifuging and then dried at 80° C. in a vacuum oven for several hours.

Testing the Color Properties of the Composite Particles:

A paint film was produced in the following way. The base paint consisted of a mixture of 3500.0 g of the alkyd resin Alkydal F 48 (55% dry residue in 38:7 white spirit: xylene; Bayer AG, DE), 385.0 g solvent naphtha 100, 28.8 g 2-butanone oxime, 55% in white spirit and 96.3 g ethyl glycol acetate. A shaker (Olbrich paint mixer rm 5000) was used for dispersion. A 100 ml wide-neck glass bottle (round) was used as a grinding unit. 50.0 g of Al$_2$O$_3$ balls of d=1.6 mm–2.5 mm were used. 40.0 g of the above base paint mixture (approx. 48% dry residue), the drying agents, 0.38 g Octa-Soligen lead with 24% Pb; 0.10 g Octa-Soligen cobalt with 6% Co (all Borchers GmbH, Monheim, Del.) and a quantity of composite particles were added to the grinding unit (100 ml wide-neck glass bottle, round) such that a concentration of haematite corresponding to 1 wt. % relative to the dry paint was established. The mixture was then dispersed for 3 hours. The drying agents were added immediately before dispersion.

The fully dispersed paints were filtered through disposable screens having a mesh width of approx. 280 μm. To assess the pigments the dispersed paints were spread onto black and white tiles (opal glass tiles) using a coating roller system (gap height as required). Drying took place for one day at room temperature and then 1 h at 65° C. in the drying oven. Diffuse reflectance spectra were recorded in the ultraviolet and visible spectral range.

Figure 2:
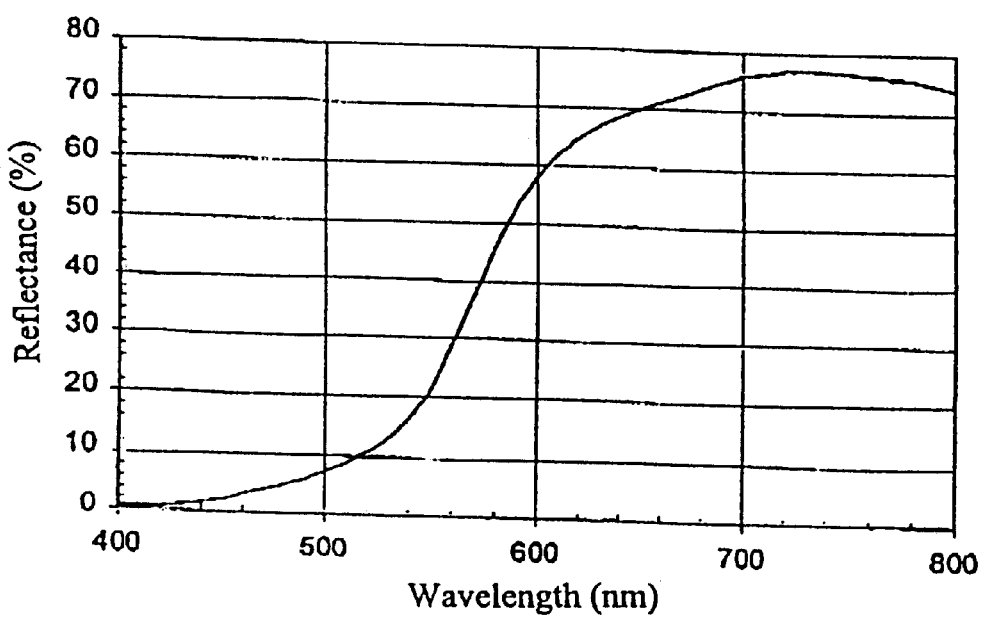

FIGS. 1 and 2 demonstrate the advantageous properties of the above paint based on the composite particles according to the invention.

The figures show the diffuse reflectance by the coats of paint on the black and white substrate as a function of the wavelength.

The reflectance by this paint on the black substrate (FIG. 1) is almost independent of the wavelength and varies only between 0.6% and 1.8% in the range between 400 nm and 800 nm. On the white substrate (FIG. 2) the reflectance rises from below 1% at a wavelength of 400 nm to over 75% at 760 nm. This demonstrates the low scattering power and high absorption capacity of the paint containing the composite particles according to the invention.

Figure 3:
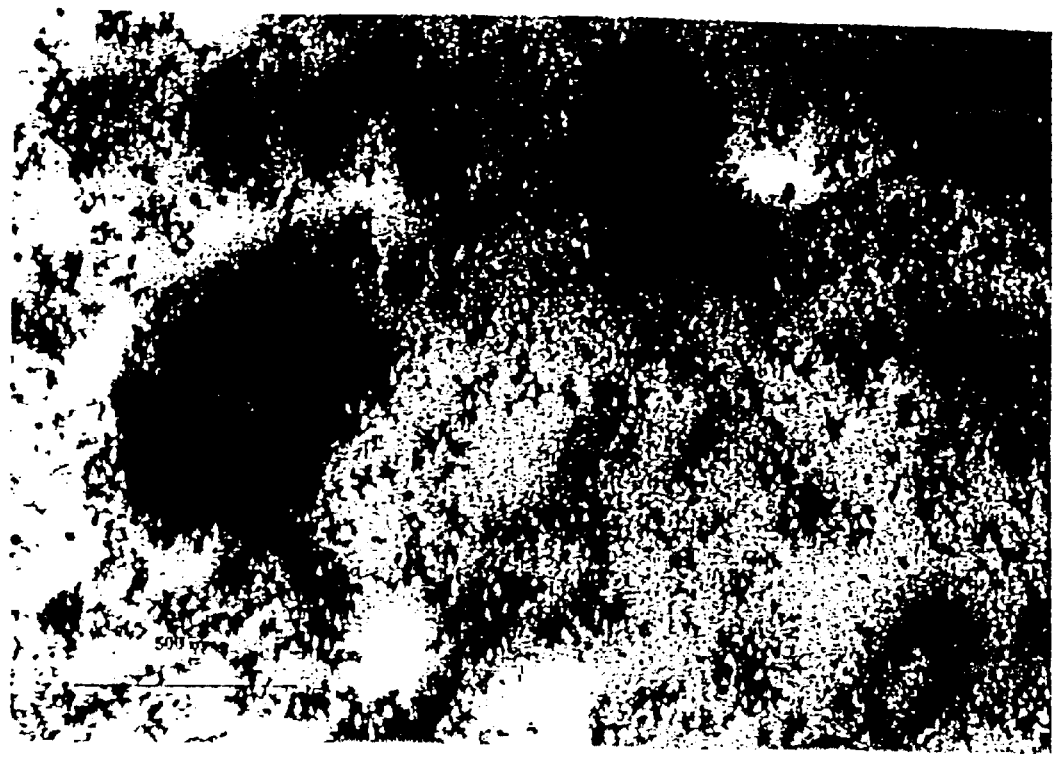
FIG. 3 shows the electron micrographs of the material of Example 1 and demonstrates the presence of agglomerates in the size range of up to several micrometers.

The composite consisting of supported pigment is in a poorly dispersed state in this paint film. Electron micrographs (FIG. 3) show the presence of agglomerates in the size range of up to several micrometers. In the case of unsupported pigments, such agglomerates inevitably lead to an undesirable haze (see comparative example).

The advantageous perceived color of the supported pigments even in a poor dispersion state is illustrated by CIELAB values measured using a Perkin Elmer Lambda 900 calorimeter (see table).

| CIELAB parameter | Haematite pigment, supported on Aerosil |
|---|---|
| L* | 65 |
| a* | 38 |
| b* | 72 |
| x | 0.55 |
| y | 0.41 |

Example 2

In order to demonstrate the advantageous effect of the composite particles according to the invention, iron oxide nanoparticles (haematite) of around 10 nm in size, which had been applied to silicon dioxide particles, were used. This particle size was able to be determined by means of electron microscopic examinations.

Production of the Composite:

The iron oxide dispersion was produced as described in example 1.

To apply these iron oxide particles to silicon dioxide supports, 190 ml distilled water were measured out and a dispersion of 10.7 g of a dispersion of silicon dioxide particles (Levasil 300/30 (Bayer AG, Leverkusen, Del.)) incorporated. The iron oxide sol was then added to the silicon dioxide dispersion with stirring, sodium hydroxide solution added until a pH value of 3.5 was obtained and the mixture stirred for a further 5 minutes. The solid was separated by centrifuging and then dried at 80° C. in a vacuum oven.

The color properties of the pigment were tested as already described in example 1.

Figure 4:
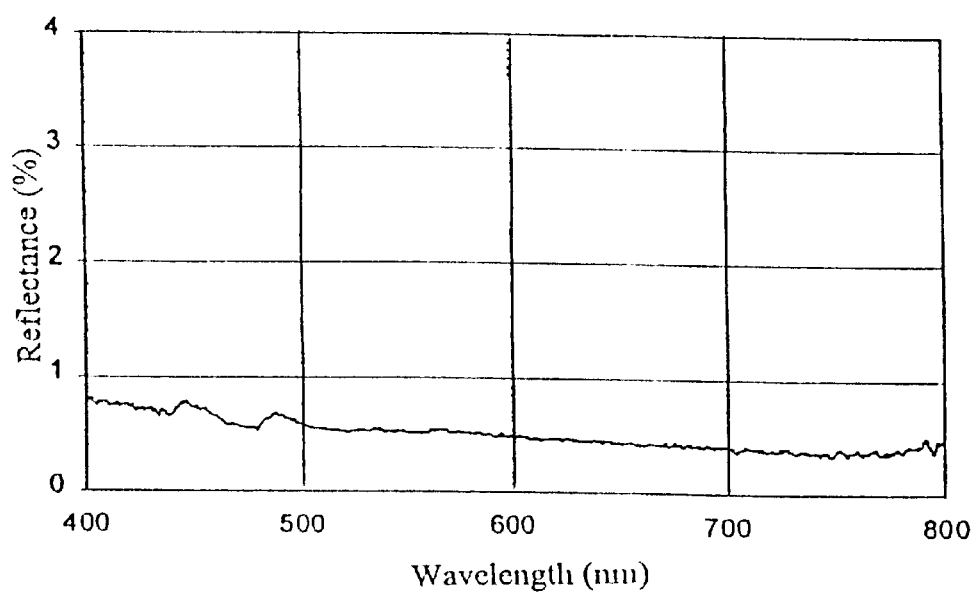
FIGS. 4 and 5 demonstrate the advantageous properties of the paint of example 2. The diffuse reflectance by the coats of paint on the black and white substrate is shown as a function of the wavelength.
Figure 5:
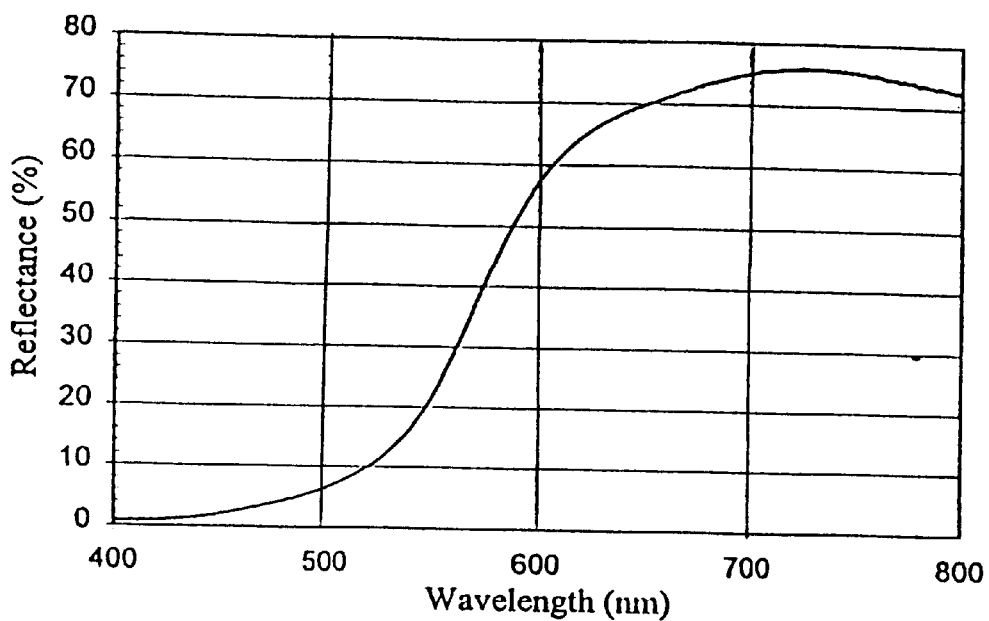

FIGS. 4 and 5 demonstrate the advantageous properties of the above paint based on the composite particle according to the invention. The figures show the diffuse reflectance by the coats of paint on the black and white substrate as a function of the wavelength.

The reflectance by this paint on the black substrate (FIG. 4) is independent of the wavelength and is below 1% in the range between 400 nm and 800 nm. On the white substrate (FIG. 5) the reflectance rises from below 1% at a wavelength of 400 nm to over 75% at 720 nm. This demonstrates the low scattering power and high absorption capacity of the paint based on composite particles containing supported iron oxide pigment.

Figure 6:
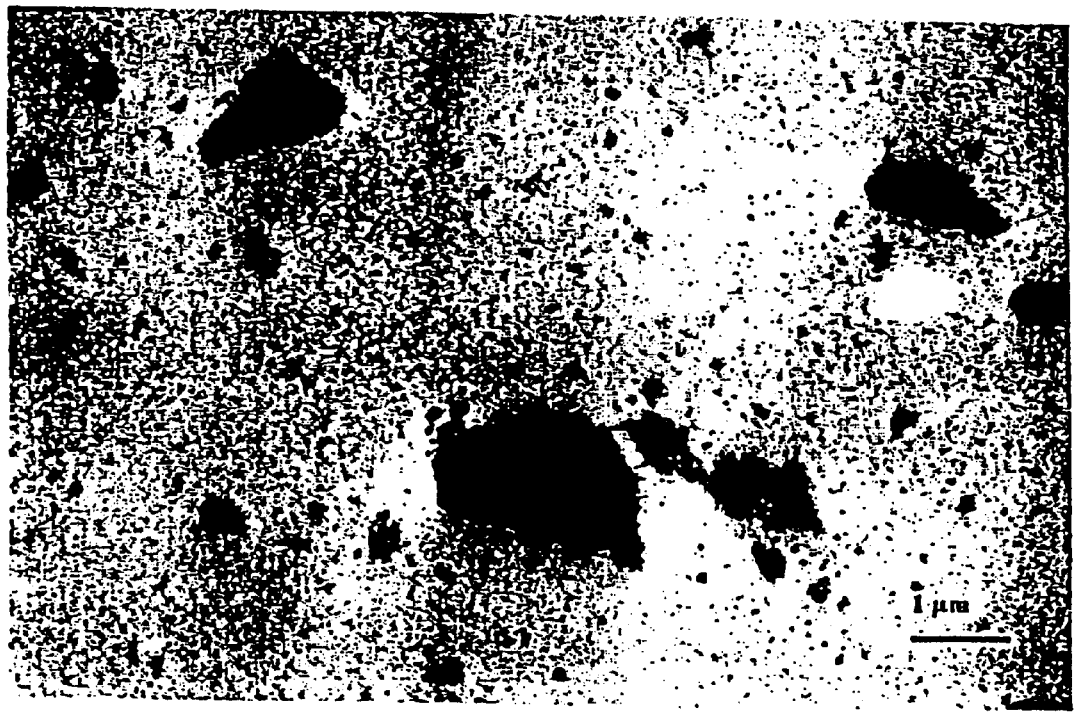
FIG. 6 shows the electron micrographs of the material of Example 2 and demonstrates the presence of agglomerates in the size range of up to several micrometers.

The composite particles containing the supported pigment are in a poorly dispersed state in this paint film. Electron micrographs (FIG. 6) show the presence of agglomerates in the size range of up to several micrometers. In the case of unsupported pigment, such agglomerates inevitably lead to an undesirable haze (see comparative example).

The advantageous perceived color of the supported pigments is illustrated by CIELAB values measured using a Perkin Elmer Lambda 900 calorimeter (see table).

| CIELAB parameter | Haematite pigment, supported on Levasil |
|---|---|
| L* | 58 |
| a* | 39 |
| b* | 76 |
| x | 0.56 |
| y | 0.42 |

Example 3

40 g of the cationically adjusted silicon oxide dispersion Levasil 200S (Bayer AG, DE) were measured out. 75 g of a dispersion of pigment nanoparticles, Bayscript Magenta VPSP 20015 (Bayer AG, DE) with a pigment content of 4 wt. % were rapidly added with stirring. The solid was then filtered off, washed and dried at 80° C. The magenta-silicon dioxide composite powder thus obtained then underwent dry grinding. A Pulverisette 2 (Fritsch GmbH, Idar-Oberstein, Del.) was used. The mill operates on the principle of a mortar mill. The grinding unit, mortar and pestle are made from agate. The pestle is loaded with the maximum pressure by shifting the weight on the lever arm. The weight and lever arm are sealed flush. The speed of the mortar was 70 rpm (at a supply frequency of 50 Hz). The internal diameter of the mortar is 150 mm. The diameter of the pestle is 70 mm. The plastic stripper was adjusted according to the manufacturer's instructions in such a way that the material to be ground was pushed under the pestle by the wall. 2.0 g of pigment were weighed in. The grinding period was 30 minutes.

Testing the Color Properties of the Composite Particles:

A paint film was produced in the following way: the base paint consisted of a mixture of 3500.0 g alkyd resin Alkydal F 48 (55% dry residue in 38:7 white spirit: xylene; Bayer AG, DE), 385.0 g solvent naphtha 100, 28.8 g 2-butanone oxime, 55 wt. % in white spirit, and 96.3 g 1-methoxy-2-propyl acetate. Dispersion was performed in a ball mill (PM 4 high-speed planetary mill (Retsch GmbH & Co. KG, Haan Del.)). The sequence of movement of the mill can be described as follows: up to four grinding vessels (planets) rotate around a common central point. The radius of the orbit to the centre of the grinding vessels is approx. 15 cm. During each revolution around the central point (sun) the grinding vessels (planets) additionally rotate in the opposite direction approx. 1.2 times around their own vertical axis. The speed of the mill is 250 rpm. 10 agate balls of d=15 mm and 80 agate balls of d=10 mm were used. 100.0 g of the above base paint mixture (approx. 48% dry residue), the drying agents (0.94 g Octa-Soligen lead with 24% Pb, 0.25 g Octa-Soligen cobalt with 6% Co (Borchers GmbH, Monheim, Del.) and a quantity of composite particles were added to the grinding unit (250 ml agate grinding vessel) such that a concentration of composite particles corresponding to 13 wt. % relative to the dry paint was established. The entire mixture was then dispersed for 4 hours. The drying agents were added immediately before dispersion. The fully dispersed paints were filtered through disposable screens having a mesh width of approx. 400 µm.

To assess the composite particles the dispersed paint was spread onto a non-absorbent black and white card (wet film thickness=120 µm) using a coating roller system. The painted card (coating) was then dried for at least 12 h at room temperature.

Figure 7:
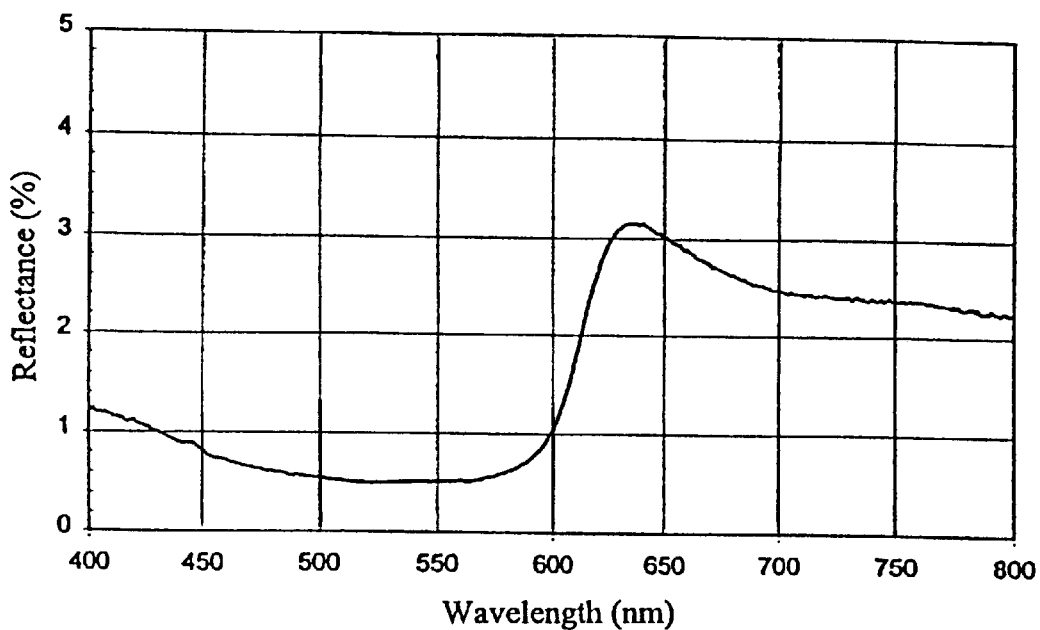
FIGS. 7 and 8 demonstrate the advantageous properties of the paint of example 3. The diffuse reflectance by the coats of paint on the black and white substrate is shown as a function of the wavelength.
Figure 8:
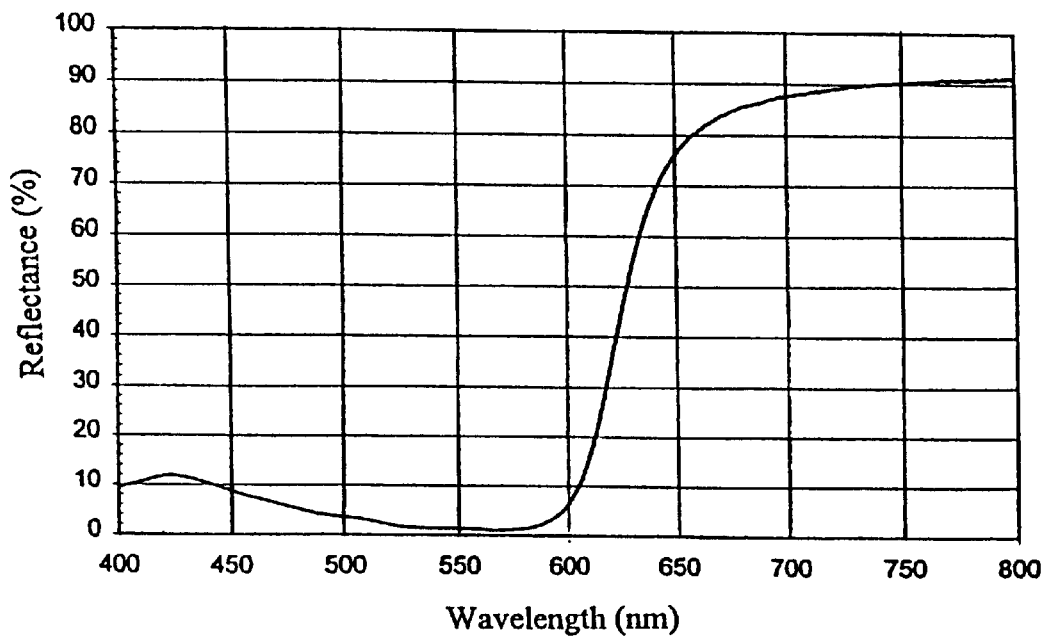

FIGS. 7 and 8 demonstrate the advantageous properties of the above paint based on the composite particles according to the invention. The diffuse reflectance by the coats of paint on the black and white substrate is shown as a function of the wavelength.

The reflectance by this paint on the black substrate (FIG. 7) is slightly dependent on the wavelength and is below 3.2% in the range between 400 nm and 800 nm. On the white substrate (FIG. 8) the reflectance rises from approx. 1% at a wavelength of 560 nm to approx. 12% at 420 nm and over 90% at 750 nm. These results demonstrate the low scattering power and high absorption capacity of the highly transparent paint based on the composite particles consisting of supported organic magenta pigment.

Example 4

A transparent, yellow iron oxide pigment in the α-FeOOH modification with a specific BET surface area of approx. 110 $m^2/g$ was produced from $FeSO_4$ solution according to the prior art (DE-A 2 508 932, U.S. Pat. No. 2,558,304) by precipitation with sodium hydroxide solution in the presence of glycolic acid followed by oxidation with air. The pigment was filtered off, washed free from salts and the filter cake diluted with demineralised water to 28.2 g FeOOH/l. The suspension had a pH value of 3.5.

Levasil 300 silica sol, approx. 30 wt. % $SiO_2$ (commercial product from Bayer AG, DE) was diluted with demineralised water to 31.5 g $SiO_2/l$. The dispersion had a pH value of 10.3.

100 ml demineralised water were placed in a beaker and 15 g each of FeOOH and $SiO_2$ in the form of the specified diluted dispersions were added simultaneously within one hour at room temperature by means of two hose pumps with stirring. After stirring for a further 30 minutes the pH value was 6.4.

The composite was filtered off through a membrane filter (pore size 0.45 μm) and washed with demineralised water until the conductivity of the filtrate was <100 μS/cm. After drying at 75° C. and deagglomeration in a powder mill (Starmix), 21 g of a light brown powder were obtained with a FeOOH content of 63.5 wt. % determined by redox titration.

The color properties of the composite particles thus produced were tested as described in example 3, with the exceptions that this time the dispersion period in the high-speed planetary mill was only 60 minutes and the amount weighed in was chosen such that the pigmentation level was 5% FeOOH relative to the sum of FeOOH+ paint.

Figure 9:
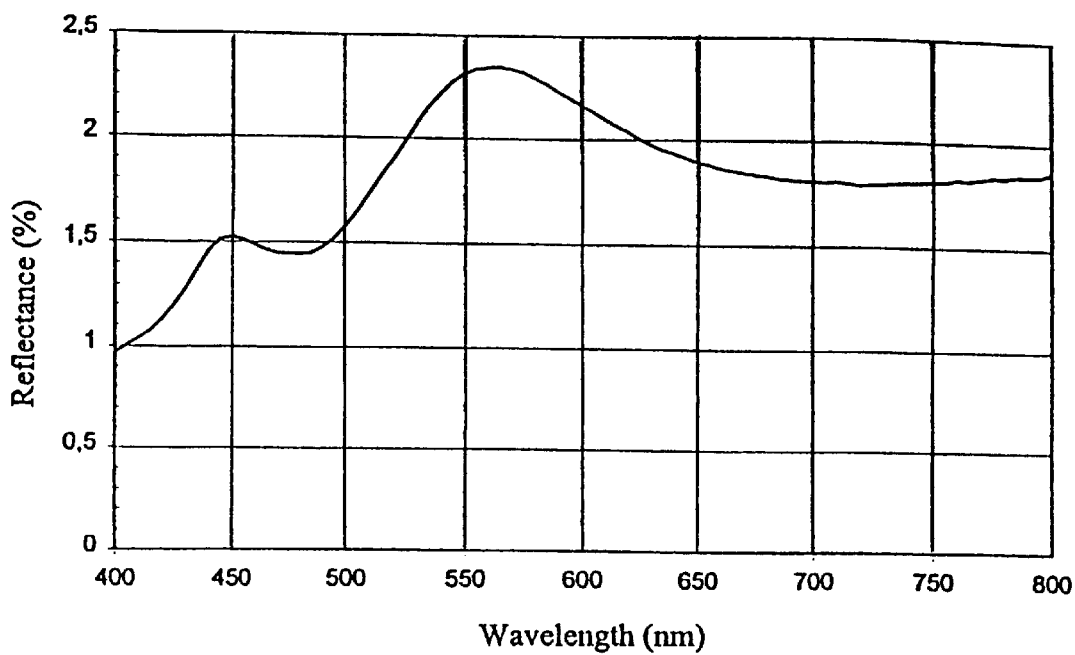
FIGS. 9 and 10 demonstrate the advantageous properties of the paint of example 4. The diffuse reflectance by the coats of paint on the black and white substrate is shown as a function of the wavelength.
Figure 10:
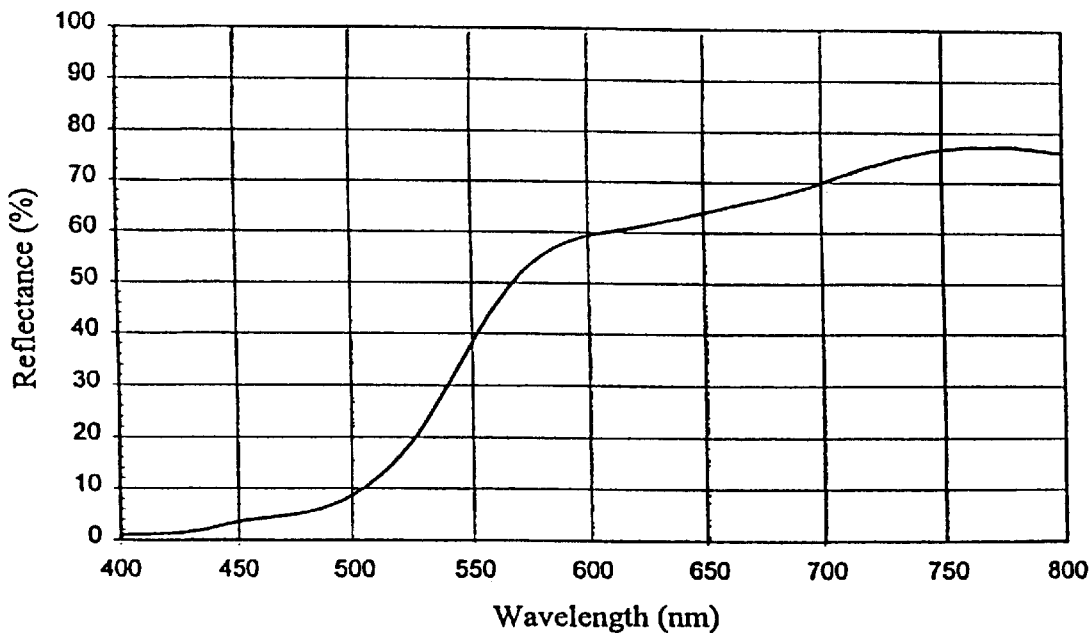

FIGS. 9 and 10 demonstrate the advantageous properties of the above paint based on the composite particles according to the invention. The figures show the diffuse reflectance by the coats of paint on the black and white substrate as a function of the wavelength.

The reflectance by this paint on the black substrate (FIG. 9) is slightly dependent on the wavelength and is below 2.5% in the range between 400 nm and 800 nm. On the white substrate (FIG. 10) the reflectance rises from approx. 1% at a wavelength of 400 nm to approx. 77% at 750 nm. These results demonstrate the low scattering power and high absorption capacity of the highly transparent paint based on the composite particles containing supported iron oxide (goethite) pigments.

The advantageous perceived color of the composite particles is illustrated by CIELAB values measured using a Perkin Elmer Lambda 900 calorimeter (see table).

| CIELAB parameter | Goethite pigment, encapsulated with Levasil particles |
|---|---|
| L* | 67 |
| a* | 23 |
| b* | 76 |
| x | 0.51 |
| y | 0.44 |

Example 5

An aqueous dispersion of nanoparticles of tin-doped indium oxide (ITO) (Nanogate GmbH, Saarbrücken, Del.) contains 20 wt. % ITO dispersed in ethanol. 4 g of the pyrogenic silicon oxide Aerosil 200 (Degussa AG, Del.) were dispersed in 100 g water and 5 g of the ITO dispersion added with vigorous stirring. The solid was separated by centrifuging and then dried at 80° C. in a vacuum oven over several hours. The ITO-silicon dioxide composite powder thus obtained then underwent dry grinding. The Pulverisette 2 mill described in example 3 was used under the conditions therein described.

Testing the Color Properties of the Pigment:

A paint film was produced in the following way: the base paint consisted of a mixture of 3500.0 g alkyd resin Alkydal F 48 (55% dry residue in 38:7 white spirit: xylene; Bayer AG, DE), 28.7 g 2-butanone oxime, 55 wt. % in white spirit, 47.8 g Octa Solingen calcium 4 basic (Borchers GmbH, Monheim, Del.), 8.1 g Octa Solingen cobalt 6 B (Borchers GmbH, Monheim, Del.), 32.0 g Octa Solingen zirconium 6 (Borchers GmbH, Monheim, Del.) and 57.7 g n-butyl glycolate.

An automatic muller as described in DIN EN ISO 8780-5 (April 1995) was used to incorporate the composite particles into the paint. (JEL 25/53, J. Engelsmann AG, Ludwigshafen, Del.). The effective plate diameter was 24 cm. The speed of the lower plate was approx. 75 rpm. The force between the plates was adjusted to approx. 0.5 kN by suspending a 2.5 kg loading weight from the loading clip. 300 mg of composite particles and 2.00 g of paint were dispersed in a single stage of 100 revolutions by the method described in DIN EN ISO 8780-5 (April 1995), section 8.1. The muller was opened and the paint quickly collected on the lower plate outside the centre point. A further 2.00 g of paint were then added and the plate closed up. After two stages of 50 revolutions each with no loading weight the preparation was finished. The paint filled with composite particles was applied to a non-absorbent black and white card using a film spreader (wet film thickness=120 μm). The painted card (coating) was then dried for 12 h at room temperature. Diffuse reflectance spectra were recorded in the ultraviolet, visible and near infrared spectral range.

Figure 11:
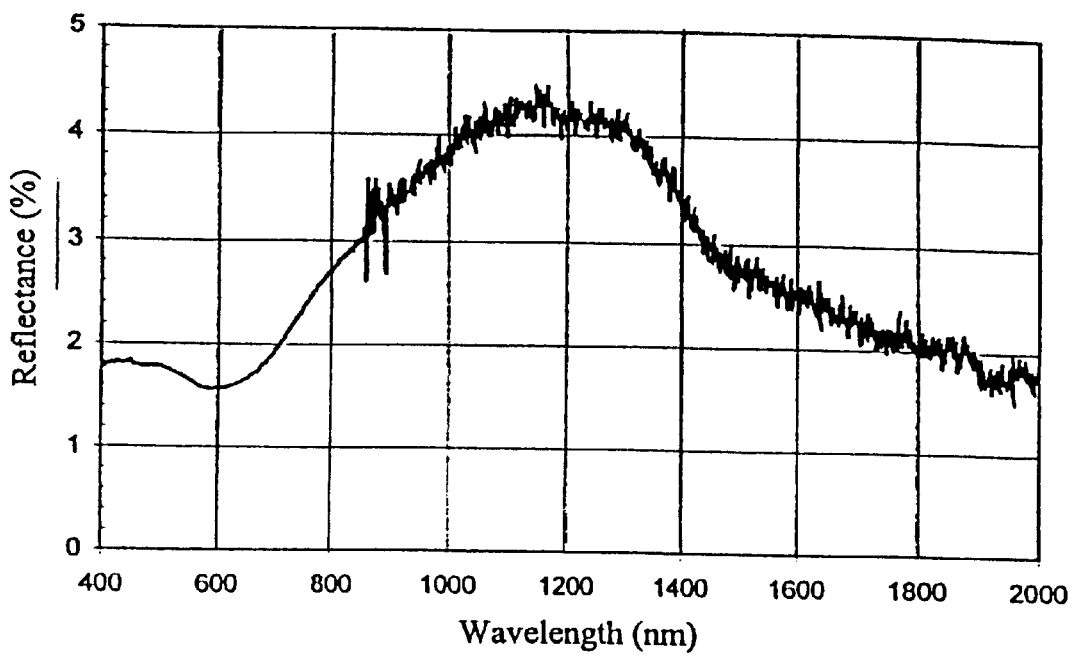
FIGS. 11 and 12 demonstrate the advantageous properties of the paint of example 5. The diffuse reflectance by the coats of paint on the black and white substrate is shown as a function of the wavelength.
Figure 12:
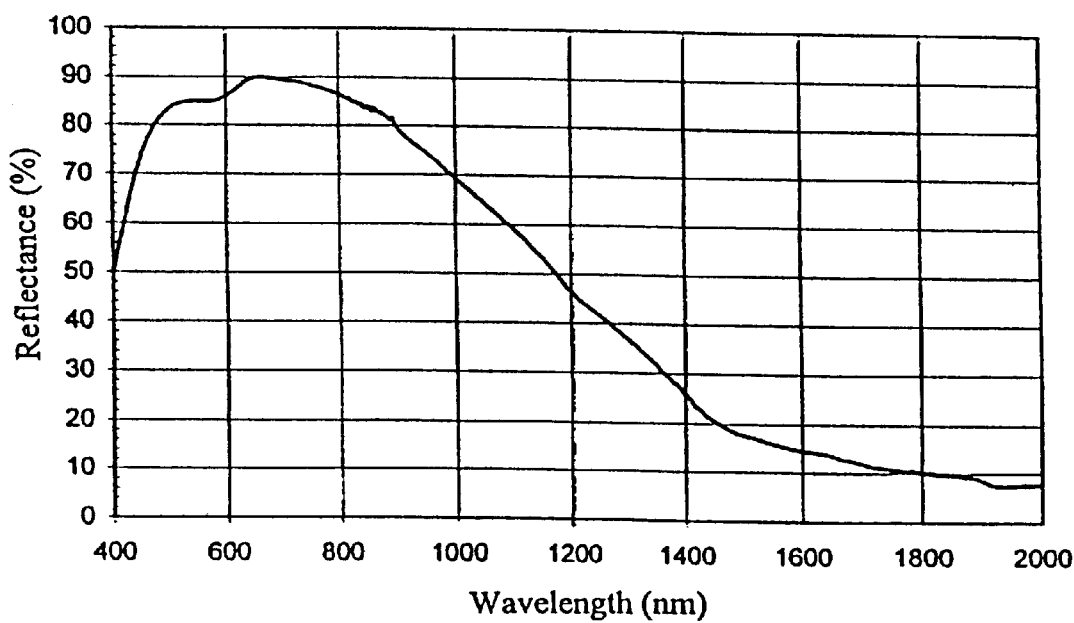

FIGS. 11 and 12 demonstrate the advantageous properties of the above paint based on the composite particles according to the invention.

The figures show the diffuse reflectance by the coats of paint on the black and white substrate as a function of the wavelength.

The reflectance of light by this paint on the black substrate (FIG. 11) is almost independent of the wavelength and is below 3% in the range between 400 nm and 800 nm. On the white substrate (FIG. 12) the reflectance falls from 90% at a wavelength of 650 nm to 10% at a wavelength of 1800 nm. This demonstrates the low scattering power and high infrared absorption capacity of the highly transparent paint based on the composite particles containing supported indium tin oxide.

Example 6

Composite particles consisting of iron oxide-silicon dioxide composite were produced as described in example 2. The powder thus obtained then underwent dry grinding. The Pulverisette 2 mill described in example 3 was used under the conditions therein described.

A plastic sheet colored with the composite particles was then produced. An additive-free, unstabilized polycarbonate (Makrolon 2808 from Bayer AG, Leverkusen) with an average molecular weight of approx. 28,000 ($M_w$ by GPC), solution viscosity: η=1.28 (5 g/l methylene chloride) was used as the plastic. 1 g of composite particles was added to 199 g of polycarbonate granules in order to obtain a 0.5 wt. % mixture. This was placed in a compounder (Brabender compounder) and compounded for 10 min at 230° C. and a speed of 30 rpm. The subsequently cooled material was then melted in a heated press (Weber, model PW-20) at 250° C. for 7 min and then press moulded into small sheets (90 mm×60 mm×2 mm) under a pressure of 200 kN. In this way polycarbonate sheets were obtained containing 0.5 wt. % of composite particles consisting of approx. 20 wt. % haematite and approx. 80 wt. % silicon oxide. This ratio of the contents of haematite and silicon oxide is optimised according to the relationship $C_{vot} \approx (N_{ma}-N_{tr})/(N_{pi}-N_{tr})$ cited in the description for incorporation into polycarbonate. This sample is designated below as sample (a).

The tristimulus value (according to CIELAB with illuminant D65, 10° observer) and haze (according to ASTM D 1003) of the polycarbonate sheet were measured in order to assess color and transparency. A haze value of 9% was obtained. The tristimulus value is: L*=56.2; a*=28.7; b*=63.3.

For comparative purposes composite particles were produced in the same way as in example 2, wherein the ratios by weight of haematite to silicon oxide were (b) approx. 50 wt. %/50 wt. %, (c) approx. 33 wt. %/67 wt. % and (d) approx. 10 wt. %/90 wt. %. These composite particles were then incorporated into the polycarbonate by the method described earlier in this example. To ensure that the color-imparting haematite content is contained in a similar quantity in each polycarbonate sample, the content of support pigment in the polycarbonate was (b) approx. 0.2 wt. %, (c) approx. 0.3 wt. % and (d) approx. 1 wt. %.

The following results were obtained for the tristimulus value (according to CIELAB with illuminant D65, 10° observer, Perkin Elmer, Lambda 900) and haze (according to ASTM D 1003) of the polycarbonate sheet:

| Sample | Haematite content in support pigment (%) | Support pigment in polycarbonate (wt. %) | Haze (%) | L* | a* | b* |
|---|---|---|---|---|---|---|
| a | 20 | 0.5 | 9 | 62.2 | 25.2 | 56.1 |
| b | 50 | 0.2 | 70 | 65.9 | 19.0 | 44.9 |
| c | 33 | 0.3 | 43 | 65.6 | 21.9 | 49.9 |
| d | 10 | 1.0 | 73 | 57.0 | 28.7 | 63.3 |

This table shows that the scattering effect is lowest in sample (a), in which the relative ratio of haematite to silicon oxide in the composite particles is optimum for the polycarbonate matrix material according to the above mathematical relationship.

Example 7

An aqueous dispersion of nanoparticles of tin-doped indium oxide (ITO) (Nanogate GmbH, Saarbrücken, Del.) contains 20 wt. % ITO dispersed in ethanol. 4 g of the pyrogenic silicon oxide Aerosil 200 (Degussa AG, Del.) were dispersed in 100 g water and 20 g of the ITO dispersion added with vigorous stirring. The solid was separated by centrifuging and then dried at 80° C. in a vacuum oven over several hours. The ITO-silicon dioxide composite powder thus obtained then underwent dry grinding. The Pulverisette 2 mill described in example 3 was used under the conditions therein described.

A plastic sheet containing the composite particles produced in this way was then produced. An additive-free, unstabilized polycarbonate (Makrolon 2808 from Bayer AG, Leverkusen) with an average molecular weight of approx. 28,000 ($M_w$ by GPC), solution viscosity: η=1.28 (5 g/l methylene chloride) was used as the plastic. 3.2 g of composite particles were added to 196.8 g of polycarbonate granules in order to obtain a 1.6 wt. % mixture. This was placed in a compounder (Brabender compounder) and compounded for 10 min at 230° C. and a speed of 30 rpm. The subsequently cooled material was then melted in a heated press (Weber, model PW-20) at 250° C. for 7 min and then press moulded into small sheets (90 mm×60 mm×2 mm) under a pressure of 200 kN. In this way polycarbonate sheets were obtained containing 1.6 wt. % of composite particles consisting of approx. 50 wt. % ITO and approx. 50 wt. % silicon oxide. This ratio of the contents of ITO and silicon oxide is optimised according to the relationship $C_{vol} \approx (N_{ma} - N_{tr})/(N_{pi} - N_{tr})$ cited in the description for incorporation into polycarbonate.

Figure 13:
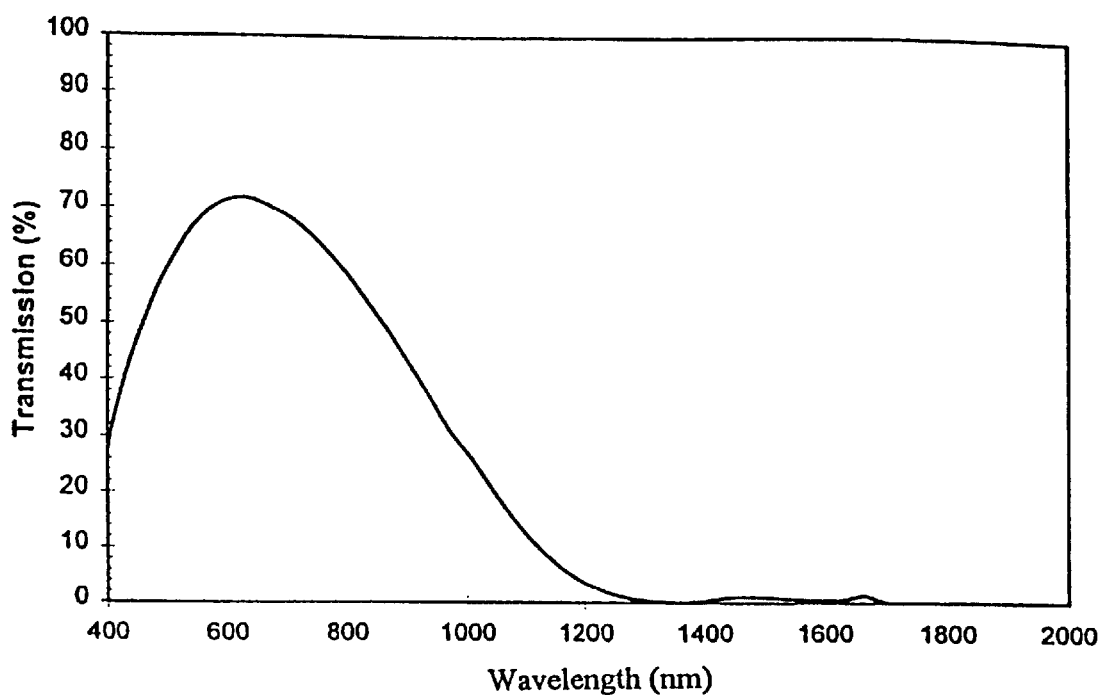
FIG. 13 shows the transmission of the sheet of example 7. The transmission and haze (according to ASTM D 1003) of the polycarbonate sheet were measured in order to assess transparency and IR absorption capacity.

The transmission and haze (according to ASTM D 1003) of the polycarbonate sheet were measured in order to assess transparency and IR absorption capacity. A haze value of 10% was obtained. The transmission of the sheet is shown in FIG. 13. The transmission rises from the UV range, reaching over 70% at a wavelength of 630 nm and falls at 1200 nm to below 3.5%. This demonstrates the high transparency of the polycarbonate sheet in the visible spectral range and the high absorption capacity in the near IR range. A sheet of this type is therefore suitable for use as a thermal insulation sheet.

Example 8

2.25 g iron(II) oxalate dihydrate were dissolved in 29.3 g water. 4 g Aerosil 200 (Degussa-Hüls AG, DE) were measured out and the iron oxalate solution added. The solid was dried for 12 h at 100° C. and then heated in air for 10 h at 500° C., leading to decomposition of the iron oxalate and formation of iron oxide particles. The iron oxide-silicon dioxide composite powder thus obtained then underwent dry grinding. The Pulverisette 2 mill described in example 3 was used under the conditions therein described.

The color properties of the pigment were tested as described in example 5.

Figure 14:
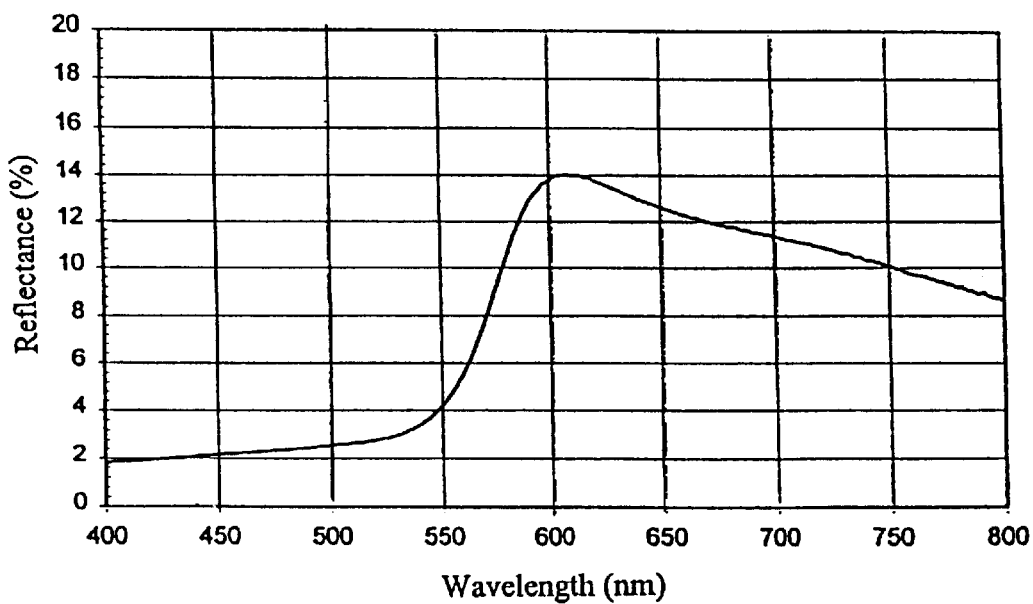
FIGS. 14 and 15 demonstrate the advantageous properties of the paint of example 8. The diffuse reflectance by the coats of paint on the black and white substrate is shown as a function of the wavelength.
Figure 15:
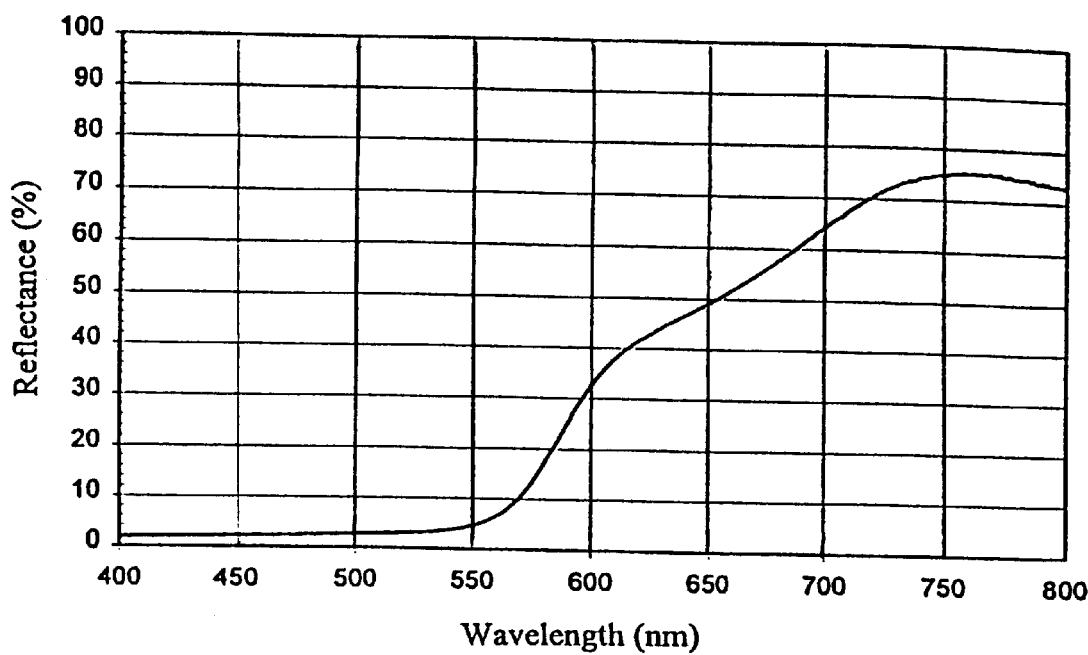

FIGS. 14 and 15 demonstrate the advantageous properties of the above paint based on the composite particles according to the invention. The figures show the diffuse reflectance by the coats of paint on the black and white substrate as a function of the wavelength.

The reflectance by this paint on the black substrate (FIG. 14) shows only a slight dependence on the wavelength and is below 14% in the range between 400 nm and 800 nm. On the white substrate (FIG. 15) the reflectance rises from approx. 2% at a wavelength of 400 nm to over 75% at 720 nm. This demonstrates the low scattering power and high absorption capacity of the transparent paint based on the supported iron oxide pigment.

Example 9

For comparison with the composite obtained by mixing dispersions or the system produced by decomposition of iron oxalate in the presence of silicon dioxide particles, an iron oxide/silicon dioxide-containing solid was produced by means of sol-gel methods, in the synthesis of which both substances are formed by reaction from precursors.

The production method is described in the literature (G. Concas, G. Ennas, D. Gatteschi, A. Musinu, G. Piccaluga, C. Sangregorio, G. Spano, J. L. Stanger, D. Zedda, Chem. Mater. 1998, 10, 495). 5.7 g iron nitrate nonahydrate were dissolved in 18.4 g water. 20.8 g tetraethoxysilane (TEOS) were dissolved in 17.7 g ethanol. The iron nitrate solution was set out and the TEOS solution added with stirring. After one hour of stirring the pH value was 0.9. The transparent, yellow sol was poured into a plastic beaker and stored in air for 9 days. The solid gel thus formed was then dried successively for two days at 60° C., two days at 80° C. and then two days at 100° C. The sample was then calcined overnight at 800° C. (tempered in air).

The iron oxide-silicon dioxide composite thus obtained then underwent dry grinding. The Pulverisette 2 mill described in example 3 was used under the conditions therein described. The grinding period in this case too was 30 minutes.

The color properties of the composite particles were tested as described in example 3.

Figure 16:
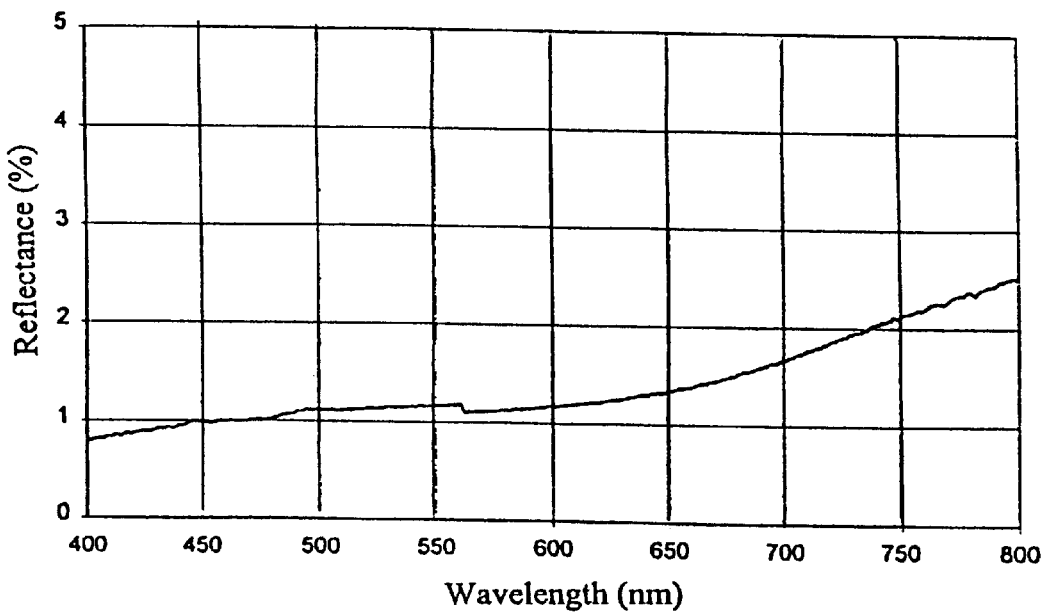
FIGS. 16 and 17 demonstrate the advantageous properties of the paint of example 9. The diffuse reflectance by the coats of paint on the black and white substrate is shown as a function of the wavelength.
Figure 17:
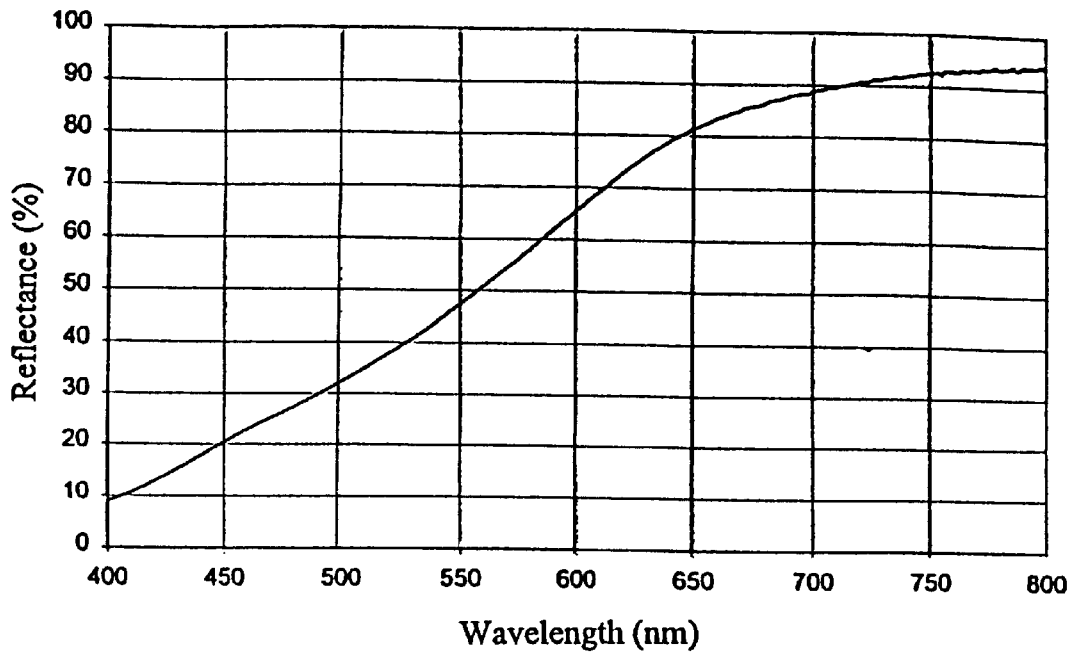

FIGS. 16 and 17 demonstrate the advantageous properties of the above paint based on the composite particles according to the invention.

The figures show the diffuse reflectance by the coats of paint on the black and white substrate as a function of the wavelength.

The reflectance by this paint on the black substrate (FIG. 16) is almost independent of the wavelength and is below 2.5% in the range between 400 nm and 800 nm. On the white substrate (FIG. 17) the reflectance rises from below 10% at a wavelength of 400 nm to over 90% at 800 nm. This demonstrates the low scattering power and high absorption capacity of the highly transparent paint based on the composite particles containing supported iron oxide pigment.

Comparative Example

To demonstrate the effectiveness of the composite particles according to the invention, a paint based on iron oxide pigment was produced in the same way as in example 1 and 2, although without applying the pigment particles to support particles.

The iron oxide dispersion was produced as described in example 1.

Figure 18:
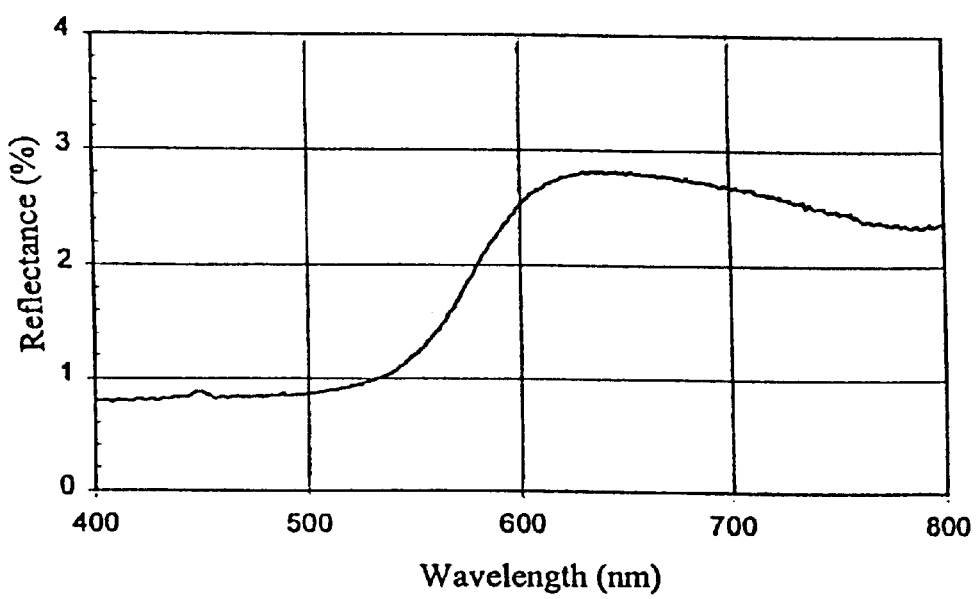
FIGS. 18 and 19 illustrate the reflectance by a paint film of the comparative example on a black and white substrate respectively.
Figure 19:
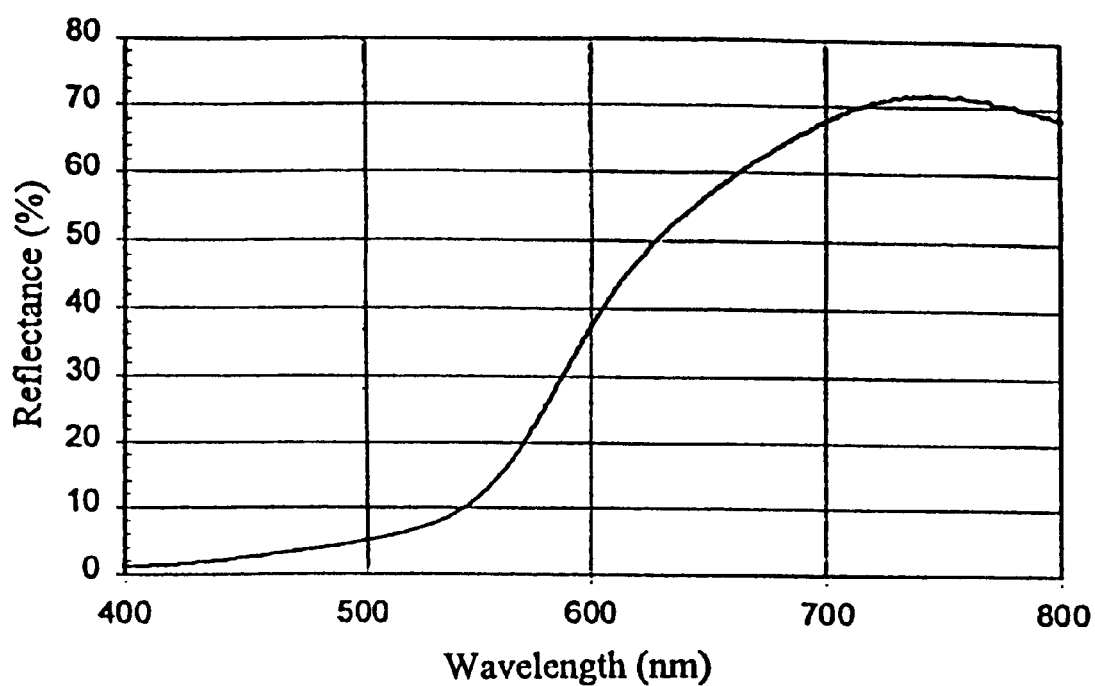

By incorporating the unsupported pigment into the paint in this way, a hazy film and dull color tone was obtained. FIGS. 18 and 19 illustrate the reflectance by a paint film of this type on a black and white substrate respectively. These measurement curves, which are illustrated for comparative purposes, demonstrate a higher reflectance by the paint on the black substrate (FIG. 18) due to the increased scattering effect of the agglomerated pigments. By contrast, the reflectance by the paint on the white substrate is perceptibly lower, equating to a duller color tone (FIG. 19). The measurement curves verify the clear advantage in terms of color properties for the paint containing the composite particles according to the invention. The following table compares the CIELAB values measured with a Perkin Elmer Lambda 900 colorimeter.

| CIELAB parameter | Unsupported iron oxide haematite | Iron oxide haematite supported on Aerosil ® 200 | Iron oxide haematite supported on Levasil ® 300/30 |
| --- | --- | --- | --- |
| L* | 50 | 65 | 58 |
| a* | 37 | 38 | 39 |
| b* | 53 | 72 | 76 |
| x | 0.54 | 0.55 | 0.56 |
| y | 0.39 | 0.41 | 0.42 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composite particle comprising a solid inorganic or organic colorless support material and adherent to it an inorganic and/or organic pigment particle,
wherein the pigment particle has an average particle size of 1 nm to 100 nm, comprises at least one primary pigment particle and the minimum average distance between two pigment particles is at least one quarter of the diameter of the primary pigment particle.

2. The composite particle of claim 1 wherein the support material comprises at least one support particle having an average primary particle size of 1 nm to 200 nm.

3. The composite particle of claim 1 wherein the pigment particles are encapsulated or coated with the support material, whereby the average encapsulation or coating thickness of the shell is at least one eighth of the diameter of the primary pigment particle.

4. The composite particle of claim 3 wherein the pigment particles are encapsulated by a particulate support material.

5. The composite particle of claim 3 wherein the pigment particles are coated by a solid continous support material.

6. The composite particle of claim 1 wherein the average pigment particle size is between 1 nm and 50 nm.

7. The composite particle of claim 1 wherein the pigment particle comprises one primary pigment particle that is substantially not agglomerated with other pigment particles.

8. The composite particle of claim 1 wherein the pigment particle comprises an agglomerate of primary pigment particles.

9. The composite particle of claim 1 wherein the inorganic pigment is selected from the group consisting of oxides, nitrides, phosphides and sulfides of metals and semiconductors, aluminates, iron oxides and iron oxide hydroxides, chromium oxides, cadmium sulfide, cadmium selenide, cadmium sulfoselenide, bismuth vanadate, chromate pigments, ultramarine pigments, iron-blue pigments and mixed phase pigments.

10. The composite particle of claim 1 wherein the inorganic pigment is selected from the group consisting of doped materials.

11. The composite particle of claim 1 wherein the pigment particle or the support material absorbs infrared radiation from the near or solar infrared range.

12. The composite particle of claim 1 wherein the support material has a real refractive index of between 1.3 and 1.9 in the visible spectral range.

13. A composite material comprising at least two different composite particles of claim 1.

14. The composite material of claim 13 wherein at least one composite particle comprises a pigment particle different from the pigment particle in another composite particle.

15. The composite material of claim 13 wherein at least one composite particle comprises a support particle different from the support particle in another composite particle.

16. The composite material of claim 13 wherein one composite particle comprises an encapsulating coating material different from the encapsulating coating material in another composite particle.

17. A composition of matter comprising a matrix material and incorporated therein at least one composite particle of claim 1 wherein the refractive index of the composition differs by less than 0.3 units from that of the composite particle.

18. The composition of claim 17 wherein the matrix material comprises a plastic.

19. A coating composition comprising a composite particle of claim 1.

20. A substrate coated with the coating composition of claim 19.

* * * * *